(12) United States Patent
Lindberg

(10) Patent No.: US 8,937,638 B2
(45) Date of Patent: Jan. 20, 2015

(54) METHOD AND APPARATUS FOR TRACKING ACTIVE SUBJECT IN VIDEO CALL SERVICE

(75) Inventor: Phillip Lindberg, Helsinki (FI)

(73) Assignee: Tellybean Oy, Helsinki (FI)

( * ) Notice: Subject to any disclaimer, the term of this patent is extended or adjusted under 35 U.S.C. 154(b) by 203 days.

(21) Appl. No.: 13/571,775

(22) Filed: Aug. 10, 2012

(65) Prior Publication Data

US 2014/0043432 A1    Feb. 13, 2014

(51) Int. Cl.
*H04N 7/14*    (2006.01)
(52) U.S. Cl.
CPC ....................................... *H04N 7/14* (2013.01)
USPC ................... 348/14.16; 348/14.01; 348/14.12
(58) Field of Classification Search
CPC ......... H04N 7/14; H04N 7/141; H04N 7/142; H04N 7/147; H04N 7/148; H04N 7/15; H04N 7/152
USPC ........................................... 348/14.01–14.16
See application file for complete search history.

(56) References Cited

U.S. PATENT DOCUMENTS

2012/0062688 A1* 3/2012 Shen et al. ................. 348/14.03
2013/0342631 A1* 12/2013 Garfio et al. ............... 348/14.01

* cited by examiner

*Primary Examiner* — Melur Ramakrishnaiah
(74) *Attorney, Agent, or Firm* — Ziegler IP Law Group, LLC.

(57) ABSTRACT

A method for tracking an active subject in a video call service includes establishing a peer-to-peer connection between a videophone input apparatus and a peer over a wireless connection; receiving information of a first resolution display of an A/V output apparatus of the peer; and generating a local video stream in the videophone apparatus based on a video signal provided by a second resolution camera of the videophone apparatus, the second resolution being greater than the first resolution. The method further includes generating a local audio stream in the videophone input apparatus based on an audio signal provided by a microphone of the videophone input apparatus; determining active subject information of the video call using at least one of the local video stream and the local audio stream; targeting the local video stream towards the active subject by selecting a first resolution view area from the second resolution video signal based on the determined active subject information; and transmitting the first resolution view area for displaying on the first resolution display.

10 Claims, 7 Drawing Sheets

METHOD AND APPARATUS FOR TRACKING ACTIVE SUBJECT IN VIDEO CALL SERVICE

TECHNICAL FIELD

The present application generally relates to a method, a system and an apparatus for providing a video call service.

BRIEF DESCRIPTION OF RELATED DEVELOPMENTS

Due to recent advances of mobile telecommunications, popularity of mobile phones has been greatly increased. At the same time, the usage of fixed landline phone connections at home has been reduced. Video calls are widely used as a communication method providing people not only speech but streaming video of the other party as well. High-speed telecommunication networks enable video call activation between computers and cellular phones.

However, using computers or cellular phones for video calls has certain drawbacks. First, a video call is typically utilized using a video camera attached to a computer or and A/V apparatus, for example. When starting the video call the user may not be sure if the camera is directed in an optimum way to scope the user in the middle of the view, for example. A number of camera adjustment rounds may be needed. Second, the other end of the video call may use various resolutions of different A/V apparatuses. The peer resolution may be very different to the resolution of the transmitting side camera. Such differences cause challenges to direct the transmitting side camera for receiving side display. The user may not know the peer end display status and how the video stream transmitted from the user can be seen by the peer. Third, during the video call, the user may move in front of the camera. Furthermore, a plurality of users may participate the video call and they may be located in different locations in the camera view, even outside of it. Again, a number of camera adjustments may be needed to adjust the video stream of the user end with a first resolution to be received and shown in an optimum and comfortable way in the peer end, and vice versa.

Thus, a solution is needed to provide tracking an active subject in a video call service that is easy-to-use, low-cost, utilizing different resolutions in different ends of the call and still being highly-functional. Furthermore, a solution is needed to enhance the experience to all users of the service with a convenient way to increase the perceived quality of the video call through superior video call compositions.

SUMMARY

According to a first example aspect of the disclosed embodiments there is provided a videophone input apparatus, for tracking an active subject in a video call service, comprising:
  a communication interface for communicating with a peer;
  at least one processor; and
  at least one memory including computer program code; the at least one memory and the computer program code configured to, with the at least one processor, cause the videophone input apparatus to:
    establish a peer-to-peer connection between the videophone input apparatus and a peer over a wireless connection;
    receive information of a first resolution display of an A/V output apparatus of the peer;
    generate a local video stream in the videophone apparatus based on a video signal provided by a second resolution camera of the videophone apparatus, the second resolution being greater than the first resolution;
    generate a local audio stream in the videophone input apparatus based on an audio signal provided by a microphone of the videophone input apparatus;
    determine active subject information of the video call using at least one of the local video stream and the local audio stream;
    target the local video stream towards the active subject by selecting a first resolution view area from the second resolution video signal based on the determined active subject information; and
    transmit the first resolution view area for displaying on the first resolution display.

In an embodiment, the at least one memory and the computer program code configured to, with the at least one processor, cause the videophone input apparatus further to:
    recognize the active subject from the second resolution video signal using shape recognition; and
    determine active subject information based on the recognized active subject.

In an embodiment, the at least one memory and the computer program code configured to, with the at least one processor, cause the videophone input apparatus further to:
    recognize the active subject from the audio signal using sound direction detection; and
    determine active subject information based on the recognized active subject.

According to a second example aspect of the disclosed embodiments there is provided a method for tracking an active subject in a video call service comprising:
    establishing a peer-to-peer connection between the videophone input apparatus and a peer over a wireless connection;
    receiving information of a first resolution display of an A/V output apparatus of the peer;
    generating a local video stream in the videophone apparatus based on a video signal provided by a second resolution camera of the videophone apparatus, the second resolution being greater than the first resolution;
    generating a local audio stream in the videophone input apparatus based on an audio signal provided by a microphone of the videophone input apparatus;
    determining active subject information of the video call using at least one of the local video stream and the local audio stream;
    targeting the local video stream towards the active subject by selecting a first resolution view area from the second resolution video signal based on the determined active subject information; and
    transmitting the first resolution view area for displaying on the first resolution display.

In an embodiment, the method further comprising:
    recognizing the active subject from the second resolution video signal using shape recognition; and
    determining active subject information based on the recognized active subject.

In an embodiment, the method further comprising:
    recognizing the active subject from the audio signal using sound direction detection; and
    determining active subject information based on the recognized active subject.

In an embodiment, the method further comprising:
    generating the local audio stream in the videophone input apparatus based on audio signals provided by at least two microphones of the videophone input apparatus;
    recognizing the active subject from the audio signals using sound direction detection; and determining active subject information based on the recognized active subject.

In an embodiment, the method further comprising:

targeting the local video stream towards the active subject by selecting a first resolution view area from the second resolution video signal based on the determined active subject information.

In an embodiment, the method further comprising:

targeting the local video stream towards the active subject using at least one of the following:

moving the first resolution view area in a horizontal direction;

moving the first resolution view area in a vertical direction; and zooming the first resolution view area.

According to a third example aspect of the disclosed embodiments there is provided a computer program embodied on a computer readable medium comprising computer executable program code, which when executed by at least one processor of a videophone input apparatus, causes the videophone input apparatus to:

establish a peer-to-peer connection between the videophone input apparatus and a peer over a wireless connection:

receive information of a first resolution display of an A/V output apparatus of the peer;

generate a local video stream in the videophone apparatus based on a video signal provided by a second resolution camera of the videophone apparatus, the second resolution being greater than the first resolution;

generate a local audio stream in the videophone input apparatus based on an audio signal provided by a microphone of the videophone input apparatus;

determine active subject information of the video call using at least one of the local video stream and the local audio stream;

target the local video stream towards the active subject by selecting a first resolution view area from the second resolution video signal based on the determined active subject information; and transmit the first resolution view area for displaying on the first resolution display.

Different non-binding example aspects and embodiments of the disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The aspects of the disclosed embodiments will be described, by way of example only, with reference to the accompanying drawings, in which.

DETAILED DESCRIPTION

In the following description, like numbers denote like elements.

Figure 1:
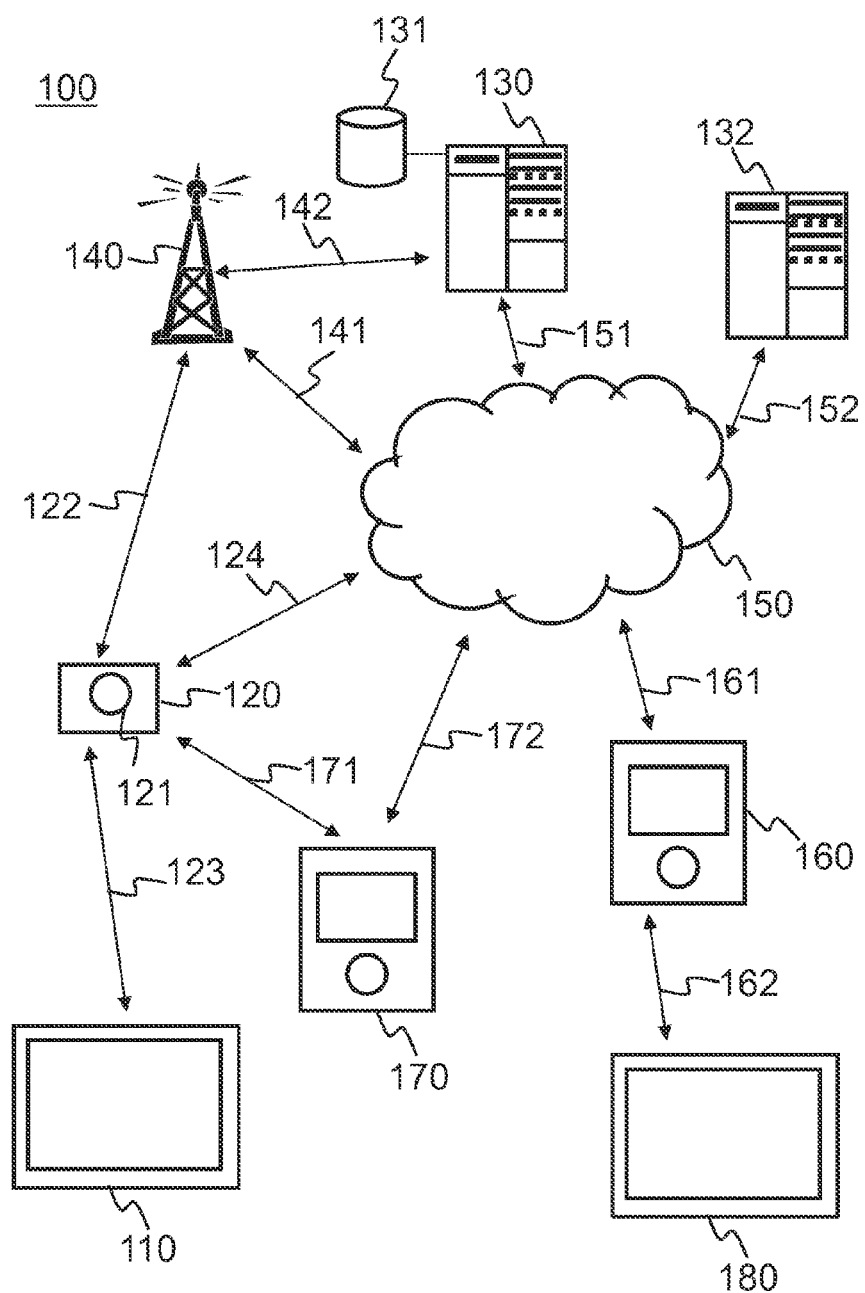
FIG. 1 shows a schematic picture of a system according to an aspect of the disclosed embodiments.

FIG. 1 shows a schematic picture of a system 100 according to an example embodiment. A user apparatus, such as a videophone input apparatus 120 may comprise a mobile terminal comprising a camera and a communication interface. The videophone input apparatus 120 may also comprise a videophone input apparatus without a display, for example. The videophone input apparatus 120 is capable of downloading and locally executing software program code. The software program code may be a client application of a service whose server application is running on a server apparatus 130, 132 of the system 100. The videophone input apparatus 120 may comprise a camera 121 for providing video stream for the video call and at least one microphone for providing audio stream for the video call, for example. In an embodiment, the videophone input apparatus may comprise a ringer or a notification speaker 290. The videophone input apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141. The videophone input apparatus 120 is configured to be connectable to the public data communication network 150, for example the Internet, directly over a data connection 124 that may comprise a fixed broadband access.

In an embodiment, the system 100 comprises an A/V output apparatus 110 configured to be connectable to the videophone input apparatus 120 over a local connection 123. The local connection 123 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V output apparatus 110 and the videophone input apparatus 120, for example. The A/V output apparatus 110 may comprise a television, for example.

In an embodiment, the videophone input apparatus 120 is integrated to the A/V output apparatus 110.

In an embodiment, the system 100 comprises a server apparatus 130, which comprises a storage device 131 for storing service data, service metrics and subscriber information, over data connection 151. The service data may comprise configuration data, account creation data, peer-to-peer service data over cellular network and peer-to-peer service data over wireless local area network (WLAN), for example. The service metrics may comprise operator information for use in both user identification and preventing service abuse, as the device 120 and the user account are locked to a subscriber of an operator network using the subscriber identity module (SIM) of the device 120 and the service account details.

In an embodiment, service data may travel over different paths. A first path may comprise sending configuration information over a wireless communication network 122, 140, 142 from the server apparatus 130. A second path may comprise sending account creation data between the server apparatus 130 and a peer-to-peer service apparatus 160 over the data connection 150, 151, 161, for example, In an embodiment, a proprietary application in the videophone input apparatus 120 may be a client application of a service whose server application is running on the server apparatus 130 of the system 100 and whose peer-to-peer client application is running on the peer-to-peer service apparatus 160. The proprietary application may capture the user input data for the videophone service and provide the user output data, from the peer, for the videophone service using the A/V output apparatus 110 over the local connection 123. In an embodiment, configuration information between the videophone input apparatus 120 and the system server 130 is transceived via the first wireless connection 122, 140, 142 automatically and configured by the server apparatus 130. Thus the user of the videophone input apparatus 120 may not need to do any initialization or configuration for the service. The system server 130 may also take care of account creation process for the service, such as videophone service between the videophone input apparatus 120 and the peer 160.

In an embodiment, the system 100 comprises a service server apparatus 132, for storing service data, service metrics and subscriber information, over data connection 152. The service data may comprise service account data, peer-to-peer service data and service software, for example.

In an embodiment, a proprietary application in the videophone input apparatus 120 may be a client application of a service whose server application is running on the server apparatus 132 of the system 100 and whose peer-to-peer client application is running on the peer-to-peer service apparatus 160. The proprietary application may capture the user input data for the videophone service and provide the user output data, from the peer, for the videophone service of the service server 132 using the A/V output apparatus 110 over the local connection 123. In an embodiment, configuration information between the videophone input apparatus 120 and the system server 130 is transceived via the first wireless connection 122, 140, 142 automatically and configured by the system server apparatus 130. Furthermore, the system server apparatus 130 may automatically create a service account in the service server 132, for the videophone apparatus 120. Thus the user of the videophone input apparatus 120 may not need to do any initialization or configuration for the service. Thus, the system server 130 may take care of account creation process for the service, such as videophone service between the videophone input apparatus 120 and the peer 160.

In an embodiment, a videophone call may be established as a peer-to-peer connection between the videophone input apparatus 120 and the peer 160 over a second wireless connection 122, 140, 141 to the public data communication network 150, 161 and to the peer 160. The second wireless connection 122, 140, 141 may comprise for example a wireless local area network connection.

In an embodiment, a videophone call may be established as a peer-to-peer connection between the videophone input apparatus 120 and the peer 160 over a second wireless connection 122, 140, 142, 151 to the public data communication network 150, 161 and to the peer 160. The second wireless connection 122, 140, 142 may comprise for example a cellular network connection provided by an operator of the system server 130.

In an embodiment, a videophone call may be established as a peer-to-peer connection between the videophone input apparatus 120 and the peer 160 over a data connection 124 to the public data communication network 150, 161 and to the peer 160. The data connection 124 may comprise for example a wired local area network connection.

In an embodiment, the videophone input apparatus 120 may be connected over a local connection 171 to a mobile apparatus 170, such as a mobile phone. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet, a laptop or a remote controller. The mobile apparatus 170 may be used for remotely controlling the videophone input apparatus 120.

In an embodiment, the videophone input apparatus 120 may be connected over a local data connection 124 to a network 150, such as Internet, and furthermore over a data connection 172 to the mobile apparatus 170 and over a data connection 151 to a system server apparatus 130, 131. The local connection may be a wireless connection and comprise Infrared, Bluetooth™, Radio Frequency Identification (RF-ID), wireless local area network (WLAN) or near field communication (NFC), for example. The mobile apparatus 170 may comprise, for example, a mobile phone, a tablet or a laptop. The mobile apparatus 170 may be used for remotely controlling the videophone input apparatus 120. The videophone input apparatus 120 may be used primarily for consumption of media, whilst any configuration tasks (e.g. text entry for adding a friend to a contacts list) are performed elsewhere using existing tools with an appropriate affordance. In an embodiment, a web application utilizing the mobile apparatus 170 and a browser of the mobile apparatus 170 may be used to configure the videophone input apparatus 120. The mobile apparatus 170 may be authenticated and configuration data sent from the mobile apparatus 170 to the system server 130, 131 wherein configuration settings for the videophone input apparatus 120 is modified based on the received data. In an embodiment, the modified settings may then be sent to the videophone input apparatus 120 over the network 150 and the local connection 124 or the wireless operator 141, 140, 122. For example, a SMS-based configuration message may be used to convey the configuration data.

In an embodiment, the system 100 comprises an A/V output apparatus 180 configured to be connectable to the peer apparatus 160 over a local connection 162. The local connection 162 may comprise a wired connection or a wireless connection. The wired connection may comprise Universal Serial Bus (USB), High-Definition Multimedia Interface (HDMI), SCART interface or RCA interface, for example. The wireless connection may comprise Bluetooth™, Radio Frequency Identification (RF-ID) or wireless local area network (WLAN), for example. Near field communication (NFC) may be used for device identification between the A/V output apparatus 180 and the videophone peer apparatus 160, for example. The A/V output apparatus 180 may comprise a television, for example.

In an embodiment, the A/V output apparatus 180 comprises a first resolution display, such as 1080p (1920×1080 pixels) for example. The videophone input apparatus 120 may generate a local video stream in the videophone input apparatus 120 based on a video signal provided by a second resolution camera 121 of the videophone input apparatus 120, the second resolution being greater than the first resolution, such as 5 MP (2984×1680 pixels) for example.

In an embodiment, the videophone input apparatus 120 may receive information of the first resolution display of the A/V output apparatus 180 of the peer 160. A local video stream may be generated in the videophone input apparatus 120 based on the video signal provided by the second resolution camera 121 of the videophone input apparatus 120, the second resolution being greater than the first resolution.

Furthermore, a local audio stream may be generated in the videophone input apparatus 120 based on an audio signal provided by a microphone of the videophone input apparatus 120. Active subject information of the video call may be determined using at least one of the local video stream and the local audio stream;

In an embodiment, the local video stream may be targeted towards the active subject by selecting a first resolution view area from the second resolution video signal based on the determined active subject information. The first resolution view area may then be transmitted for displaying on the first resolution display of the A/V output apparatus 180 of the peer 160.

In an embodiment, other services and service providers than videophone service may be used. In such cases, service account creation process may be automatic for third party services as well. The service account created (e.g. for the videophone service) to the system server 130, 131 may be used to create further accounts for each service the user may choose. Such account creation may be done machine-to-machine between the system server 130, 131 and any third party, such as the service server 132. Thus, the system server 130, 131 may host all account credentials on behalf of the user or the group of users (e.g. a family or associated group of professionals in an office).

In an embodiment, configuration information between the videophone input apparatus and the system server may be transceived via the first wireless connection and a peer-to-peer connection may be established between the videophone input apparatus and the peer over a second wireless connection. The first connection for configuration information may be transmitted over cellular data connection (e.g. 3G or 4G) and the second connection for peer-to-peer content may be transmitted over non-cellular data connection (e.g. wireless LAN). However, the first or the second connection may be used for both purposes.

In an embodiment, the videophone input apparatus 120 may comprise an A/V input apparatus.

Figure 2:
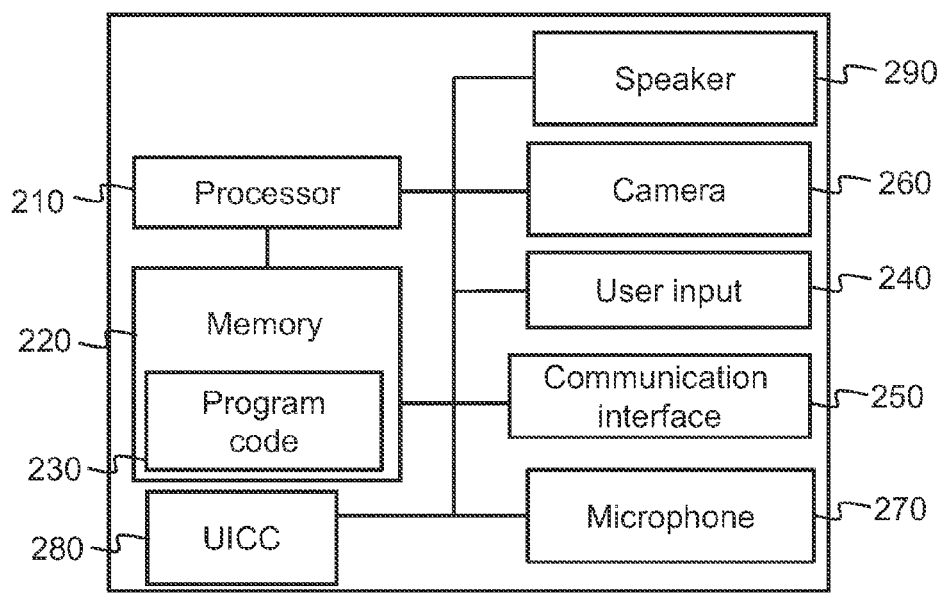
FIG. 2 presents an example block diagram of a videophone input apparatus.

FIG. 2 presents an example block diagram of a videophone input apparatus 120 in which various aspects of the disclosed embodiments may be applied. The videophone input apparatus 120 may be a user equipment (UE), user device or apparatus, such as a mobile terminal, or other communication device comprising a communication interface, a camera and a microphone.

The general structure of the videophone input apparatus 120 comprises a user input device 240, a communication interface 250, a microphone 270, a camera 260, a processor 210, and a memory 220 coupled to the processor 210. The videophone input apparatus 120 further comprises software 230 stored in the memory 220 and operable to be loaded into and executed in the processor 210. The software 230 may comprise one or more software modules and can be in the form of a computer program product. The videophone input apparatus 120 may further comprise a universal integrated circuit card (UCC) 280.

The processor 210 may be, e.g., a central processing unit (CPU), a microprocessor, a digital signal processor (DSP), a graphics processing unit, or the like. FIG. 2 shows one processor 210, but the videophone apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The videophone input apparatus 120 may comprise a plurality of memories. The memory 220 may be constructed as a part of the videophone input apparatus 120 or it may be inserted into a slot, port, or the like of the videophone input apparatus 120 by a user. The memory 220 may serve the sole purpose of storing data, or it may be constructed as a part of an apparatus serving other purposes, such as processing data.

The user input device 240 may comprise circuitry for receiving input from a user of the videophone input apparatus 120, e.g., via a keyboard, a touch-screen of the videophone apparatus 120, speech recognition circuitry, gesture recognition circuitry or an accessory device, such as a headset or a remote controller, for example.

The camera 260 may be a still image camera or a video stream camera, capable for creating multimedia data for videophone service. The camera 260 may generate a local video stream in the videophone input apparatus 120 based on a video signal provided by a second resolution camera 260 of the videophone input apparatus, the second resolution being greater than the first resolution display of an A/V apparatus of a peer.

The speaker 290 is configured to notify a user of an incoming call and to provide other user alarm sounds. Such speaker is advantageous especially in case the A/V output apparatus 110 (e.g. TV) is in off/standby mode. The speaker 290 also allows the user to answer the incoming call and hear the caller before turning the A/V output apparatus 110 (e.g. TV) on. Thus, the user may start the conversation while searching for a remote control of the A/V output apparatus 110 (e.g. TV), for example.

The microphone 270 is configured to capture user speech information for the video call service. At least one microphone 270 is further configured generate a local audio stream in the videophone input apparatus 120 based on an audio signal provided by the microphone 270 of the videophone input apparatus 120. Active subject information of the video call may be determined using at least one of the local video stream and the local audio stream.

In an embodiment, the microphone 270 may be used to disable the speaker 290 when identical audio output is detected, using the microphone 270, from an external source, such as the A/V output apparatus 110. The device speaker 290 may only be required when the A/V output apparatus 110 (e.g. TV) is switched off or operating at very low volumes. The additional audio output from the A/V output apparatus 110 (e.g. TV) is at a variable distance from the microphone 270 (measured in time), compared to the on-board speaker 290 (internal source) which is at a fixed/known distance from the microphone 270. The identical audio output may be detected based on audio data comparison and based on distance calculation the audio data source may be determined to be the A/V output apparatus 110 (e.g. TV) and the speaker 290 may be switched off automatically. The universal integrated circuit card (UICC) 280 is the smart card used in mobile terminals in GSM and UMTS networks. The UICC 280 ensures the integrity and security of all kinds of personal data, and it typically holds a few hundred kilobytes. In a GSM network, the UICC 280 contains a SIM application and in a UMTS network the UICC 280 contains a USIM application. The UICC 280 may contain several applications, making it possible for the same smart card to give access to both GSM and UMTS networks, and also provide storage of a phone book and other applications. It is also possible to access a GSM network using a USIM application and it is possible to access UMTS networks using a SIM application with mobile terminals prepared for this.

In an embodiment the videophone input apparatus 120 comprises a display 295 for presenting video phone related information to the user of the apparatus 120.

The communication interface module 250 implements at least part of data transmission. The communication interface module 250 may comprise, e.g., a wireless or a wired interface module. The wireless interface may comprise such as a WLAN, Bluetooth, infrared (IR), radio frequency identification (RF ID), NFC, GSM/GPRS, CDMA, WCDMA, or LTE (Long Term Evolution) radio module. The wired interface may comprise such as universal serial bus (USB), HDMI, SCART or RCA, for example. The communication interface module 250 may be integrated into the videophone input apparatus 120, or into an adapter, card or the like that may be inserted into a suitable slot or port of the videophone input apparatus 120. The communication interlace module 250 may support one radio interface technology or a plurality of technologies. The communication interface module 250 may support one wired interface technology or a plurality of technologies. The videophone input apparatus 120 may comprise a plurality of communication interface modules 250.

A skilled person appreciates that in addition to the elements shown in FIG. 2, the videophone input apparatus 120 may comprise other elements, such as additional microphones, extra speakers, extra cameras, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the videophone input apparatus 120 may comprise a disposable or rechargeable battery (not shown) for powering when external power if external power supply is not available.

In an embodiment, the videophone input apparatus 120 comprises speech or gesture recognition means. Using these means, a pre-defined phrase or a gesture may be recognized from the speech or the gesture and translated into control information for the apparatus 120, for example.

Figure 3:
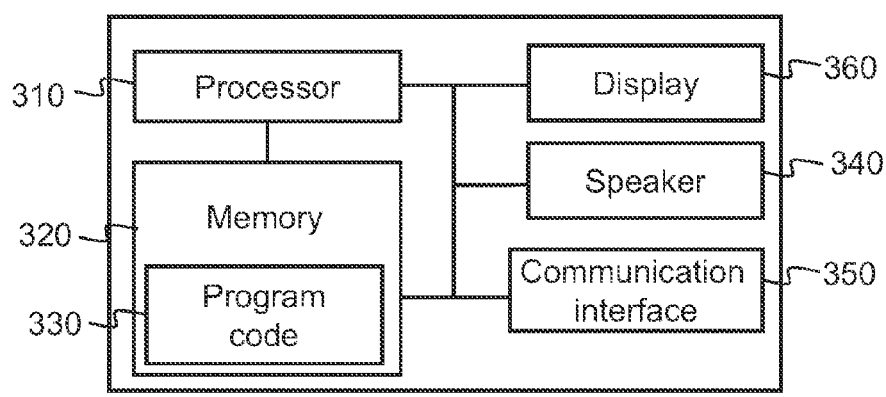
FIG. 3 presents an example block diagram of an A/V output apparatus.

FIG. 3 presents an example block diagram of an A/V output apparatus 300 in which various aspects of the disclosed embodiments may be applied. The A/V output apparatus 300 may comprise at least one of the A/V output apparatuses 110, 180 of FIG. 1 and may be a television comprising a communication interface, a display and a speaker.

The general structure of the A/V output apparatus 300 comprises a communication interface 350, a display 360, a processor 310, and a memory 320 coupled to the processor 310. The A/V output apparatus 300 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the A/V output apparatus 300 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The A/V output apparatus 300 may comprise a plurality of memories. The memory 320 may be constructed as a part of the A/V output apparatus 300 or it may be inserted into a slot, port, or the like of the A/V output apparatus 300 by a user. The memory 320 may serve the sole purpose of storing data, or it may be constructed as a part of an apparatus serving other purposes, such as processing data.

The speaker 340 may comprise a loudspeaker or multiple loudspeakers. Furthermore, the speaker 340 may comprise a jack for headphones and the headphones.

The display 360 may comprise a LED screen, a LCD screen or a plasma screen, for example. The display 360 may comprise a first resolution display, such as 1080p (1920×1080 pixels) for example. Information of the first resolution display of the A/V output apparatus 180, 300 of the peer 160 may be transmitted to the videophone input apparatus 120 for targeting purposes.

The communication interface module 350 implements at least part of data transmission. The communication interface module 350 may comprise, e.g., a wireless or a wired interface module. The wireless interface may comprise such as a WLAN, Bluetooth, infrared (IR) or radio frequency identification (RF ID) radio module. The wired interface may comprise such as universal serial bus (USB), HDMI, SCART or RCA, for example. The communication interface module 350 may be integrated into the A/V output apparatus 300, or into an adapter, card or the like that may be inserted into a suitable slot or port of the A/V output apparatus 300. The communication interface module 350 may support one radio interface technology or a plurality of technologies. The communication interface module 350 may support one wired interface technology or a plurality of technologies. The A/V output apparatus 300 may comprise a plurality of communication interface modules 350.

A skilled person appreciates that in addition to the elements shown in FIG. 3, the A/V output apparatus 300 may comprise other elements, such as microphones, speakers, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the A/V output apparatus 300 may comprise a disposable or rechargeable battery (not shown) for powering when external power if external power supply is not available.

Figure 4:
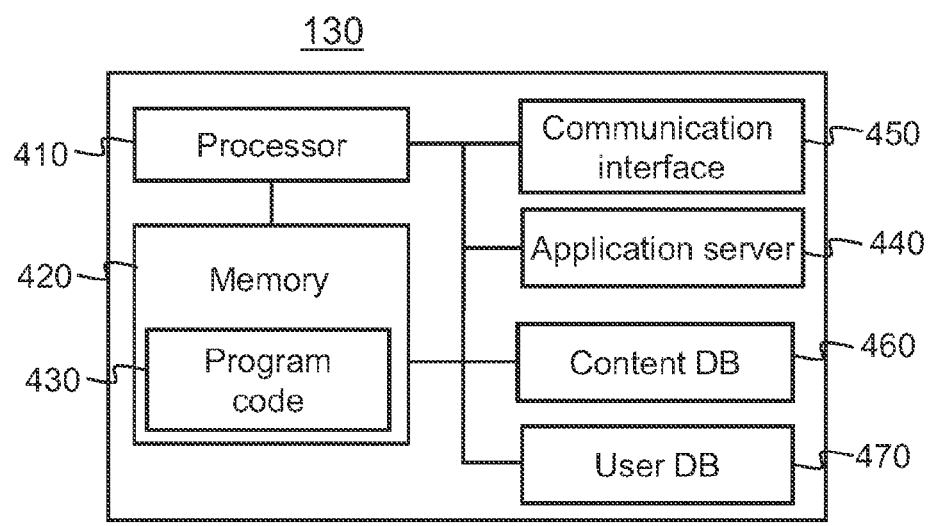
FIG. 4 presents an example block diagram of a server apparatus.

FIG. 4 presents an example block diagram of a server apparatus 130 in which various aspects of the disclosed embodiments may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of data transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as Ethernet or universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. Configuration information between the videophone input apparatus 120 and the system server 130 may be transceived using the communication interface 450. Similarly, account creation information between the system server 130 and a service provider may be transceived using the communication interface 450.

An application server 440 provides application services e.g. relating to the user accounts stored in a user database 470 and to the service information stored in a service database 460. The service information may comprise content information, content management information or metrics information, for example.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
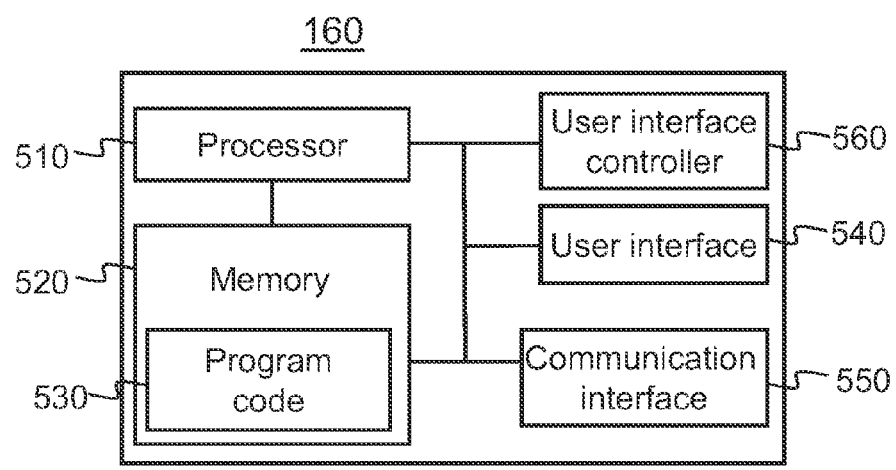
FIG. 5 presents an example block diagram of a peer apparatus.

FIG. 5 presents an example block diagram of a peer apparatus 160 in which various aspects of the disclosed embodiments may be applied. The peer apparatus 160 may be a user equipment (UE), user device or apparatus, such as a mobile terminal, a smart phone, a laptop computer, a desktop computer or other communication device.

The general structure of the peer apparatus 160 comprises a user interface 540, a communication interface 550, a processor 510, and a memory 520 coupled to the processor 510. The peer apparatus 160 further comprises software 530 stored in the memory 520 and operable to be loaded into and executed in the processor 510. The software 530 may comprise one or more software modules and can be in the form of a computer program product. The peer apparatus 160 may further comprise a user interface controller 560.

In an embodiment, the peer apparatus 160 may be remotely controlled by an external apparatus in a similar way as described before in this description between the videophone input apparatus 120 and the mobile apparatus 170.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The peer apparatus 160 may comprise a plurality of memories. The memory 520 may be constructed as a part of the peer apparatus 160 or it may be inserted into a slot, port, or the like of the peer apparatus 160 by a peer user. The memory 520 may serve the sole purpose of storing data, or it may be constructed as a part of an apparatus serving other purposes, such as processing data.

The user interface controller 560 may comprise circuitry for receiving input from a user of the peer apparatus 160, e.g., via a keyboard, graphical user interface shown on the display of the user interfaces 540 of the peer apparatus 160, speech recognition circuitry, or an accessory device, such as a headset, and for providing output to the peer user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB) or Ethernet, for example. The communication interface module 550 may be integrated into the peer apparatus 160, or into an adapter, card or the like that may be inserted into a suitable slot or port of the computer apparatus 160. The communication interface module 550 may support one radio interface technology or a plurality of technologies. The peer apparatus 160 may comprise a plurality of communication interface modules 550.

A skilled person appreciates that in addition to the elements shown in FIG. 5, the peer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the peer apparatus 160 may comprise a disposable or rechargeable battery (not shown) for powering when external power if external power supply is not available.

Figure 6:
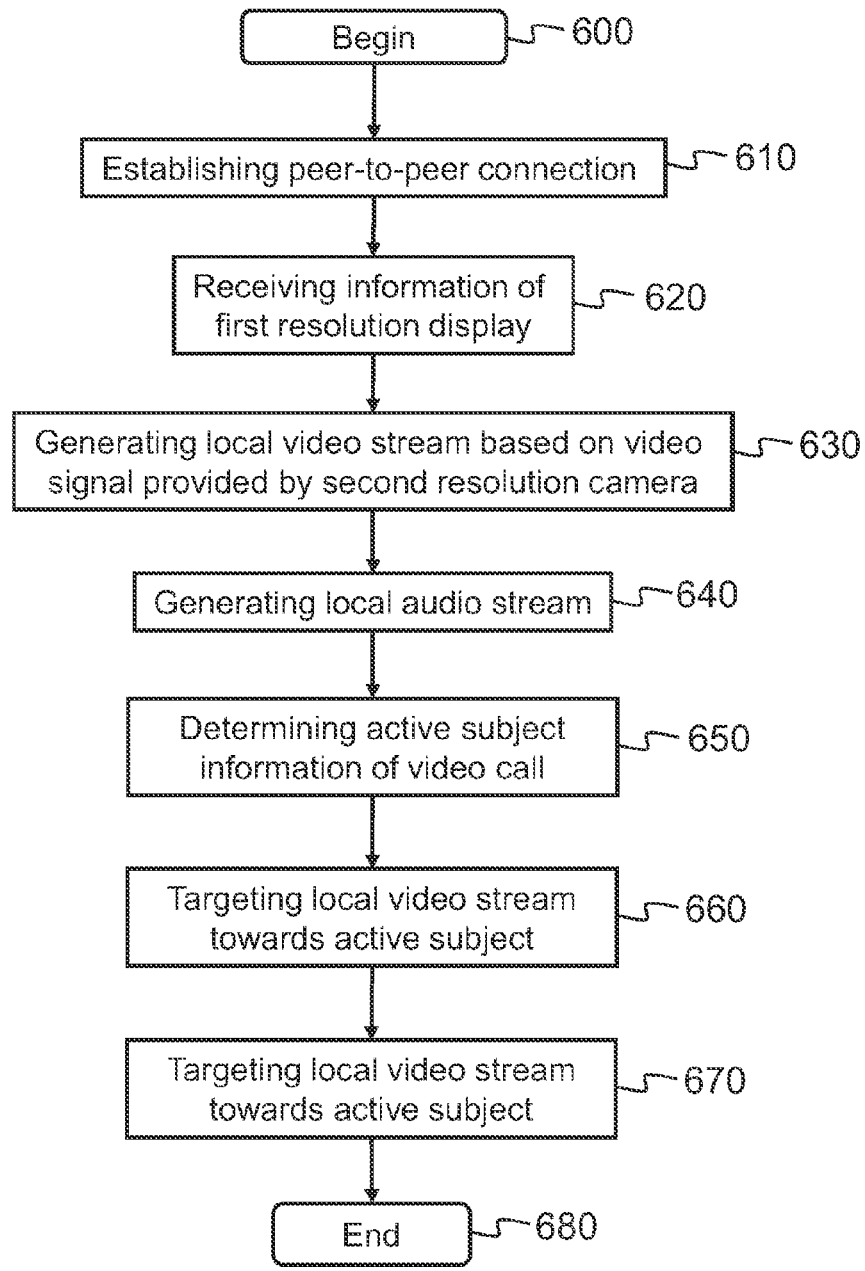
FIG. 6 shows a flow diagram showing operations in accordance with an aspect of the disclosed embodiments.

FIG. 6 shows a flow diagram showing operations in accordance with an example embodiment. In step 600, the method is started. In step 610, a peer-to-peer connection is established between a videophone input apparatus and a peer over a wireless connection. In step 620, information of a first resolution display of an A/V output apparatus of the peer is received. A local video stream is generated in the videophone apparatus based on a video signal provided by a second resolution camera of the videophone apparatus in step 630. The second resolution is greater than the first resolution. In step 640, a local audio stream is generated in the videophone input apparatus based on an audio signal provided by a microphone of the videophone input apparatus. In step 650, active subject information of the video call is determined using at least one of the local video stream and the local audio stream. In step 660, the local video stream is targeted towards the active subject by selecting a first resolution view area from the second resolution video signal based on the determined active subject information. In step 670, the first resolution view area is transmitted for displaying on the first resolution display. The method is ended in step 680.

Figure 7:
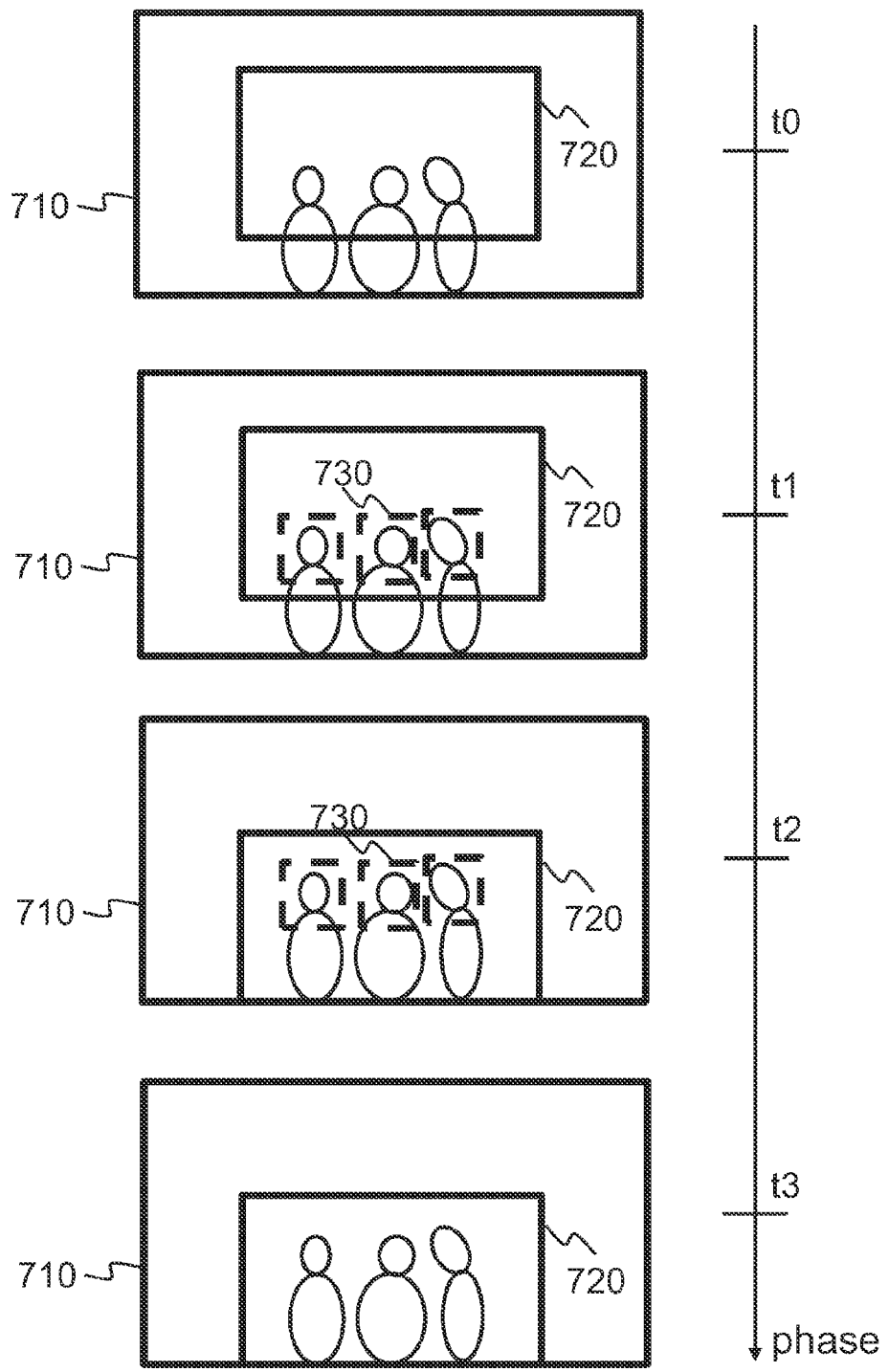
FIG. 7 shows a schematic picture of steps relating to an example embodiment.

FIG. 7 shows a schematic picture of steps relating to an example embodiment.

Phase t0 may represent a moment right after a video call connection between a videophone apparatus and a peer is established. At t0 an audio connection for the call may be opened. On a display of a peer apparatus a first resolution view area 720 presents a video stream of a videophone input apparatus participating the video call. Such stream is provided by a local camera of the videophone input apparatus. A total image capture area 710 represents a second resolution video stream provided by the camera of the video input apparatus. Resolution information of the first resolution display may be received by the videophone input apparatus from the peer in the beginning of the video call, for example. Alternatively, the display resolution information may be stored in the system, for example in the server apparatus and fetched from there when needed or stored to the video input apparatus.

In an embodiment, at t1, an algorithm is used for shape recognition. The shape recognition is configured to recognize at least one subject shape 730. The subject shape may be achieved by using basic motion and anatomy recognition of a human head or torso, for example. At phase t1, there are three subjects being recognized in FIG. 7. At least one of the three subjects is determined by the algorithm to be an active subject. Such determination may be done based on the movement of the recognized shape or randomly, for example. The generated local video stream by the videophone input apparatus may be targeted towards the active subject by selecting the first resolution view area 720 from the second resolution video signal area 710 based on the determined active subject information 730.

In an embodiment, at t2, a video image scene is adjusted using the redundant pixels afforded by an image sensor that outputs a higher actual pixel count than the maximum output capability of a display device, For example a 5 megapixel sensor produces more pixels than a HD TV can natively render (1920×1080, or 2.1 megapixels). The pixels captured by the image sensor that fall outside the maximal output range of the display device, such as a TV, represents the range of adjustability—both vertically (up/down) and laterally (left/right). Once targets are identified the output image (virtually) pans and/or tilts to align the targets to the composition layout rules, Such rules may comprise "the rule of thirds" commonly utilized as a photographic composition guide. Such rules may vary according to the number of targets and relative positioning of targets. The purpose of this method is to create compositionally balanced video call scenes by repositioning the subjects automatically, without physically adjusting the input device (camera). This method also applies to simply zooming functions ("make me bigger"/"make me smaller") This method can be part of an initial set-up procedure, or function as a dynamic feature that continually optimizes according to the number of subjects in the scene (i.e. people moving in/out of the scene, conversation tracking, etc.). As can be seen in FIG. 7, at t2, the first resolution view area 720 is targeted downwards compared to phase t0-t1, based on the determined active subject information. Furthermore, the ability to prioritize adjustability in a certain direction may be enhanced by modifying the orientation that the image sensor is mounted. For example, to promote "tilt" adjustability (up or down) the image sensor can be mounted at 90 degrees to the standard, in effect providing a "portrait" capture instead of the default "landscape". This would offer a greater range of virtual adjustment up and down.

In an embodiment, at t3, the first resolution view area 720 is transmitted from the videophone input apparatus for displaying on the first resolution display of the peer. The results may also be previewed on the local display device in the form of a preview (one's own image).

Figure 8:
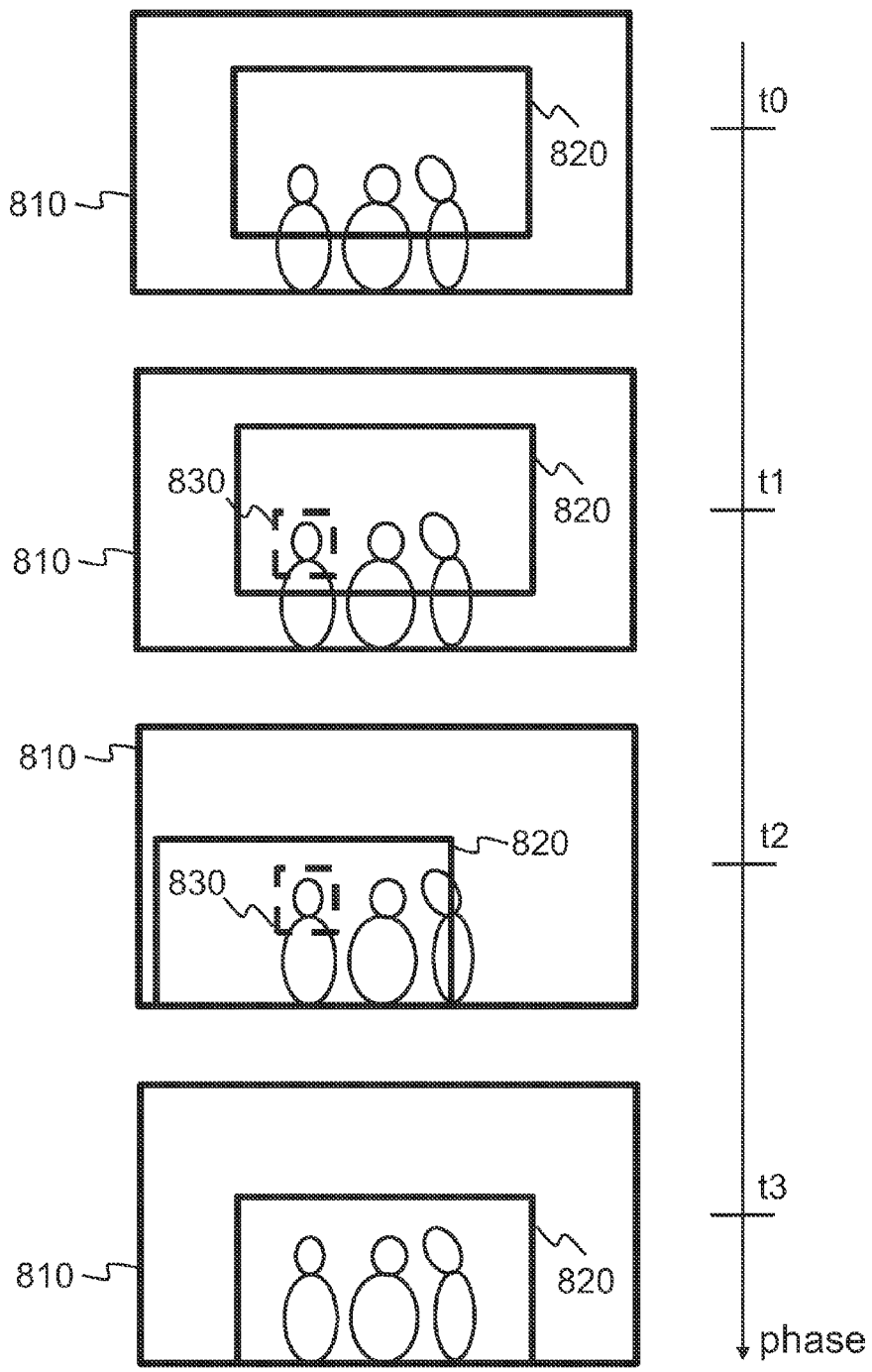
FIG. 8 shows a schematic picture of steps relating to an example embodiment.

FIG. 8 shows a schematic picture of steps relating to an example embodiment,

Phase t0 may represent a moment right after a video call connection between a videophone apparatus and a peer is established. At t0 an audio connection for the call may be opened. On a display of a peer apparatus a first resolution view area 820 presents a video stream of a videophone input apparatus participating the video call. Such stream is provided by a local camera of the videophone input apparatus. A total image capture area 810 represents a second resolution video stream provided by the camera of the video input apparatus. Resolution information of the first resolution display may be received by the videophone input apparatus from the peer in the beginning of the video call, for example. Alternatively, the display resolution information may be stored in the system, for example in the server apparatus and fetched from there when needed or stored to the video input apparatus.

In an embodiment, at t1, an algorithm is used for motion and shape recognition. The shape recognition is configured to recognize at least one subject shape. The subject shape may be achieved by using basic anatomy recognition of a human head or torso, for example. At phase t1, there is one subject being recognized in FIG. 8 and determined by the algorithm to be an active subject 830. Such determination may be done based on the movement of the recognized shape or randomly, for example. The generated local video stream by the videophone input apparatus may be targeted towards the active subject 830 by selecting the first resolution view area 820 from the second resolution video signal area 810 based on the determined active subject information.

In an embodiment, at t2, a video image scene is adjusted using the redundant pixels that fall outside the maximal output range of the peer display device, such as a TV. Once targets are identified the output image (virtually) pans to align the targets to the composition layout rules, which vary according to number of targets and relative positioning of targets. The purpose of this method is to create compositionally balanced video call scenes by repositioning the subjects automatically, without physically adjusting the input device (camera). This method also applies to simply zooming functions ("make me bigger"/"make me smaller") This method can be part of a set procedure, or as a dynamic feature that continually optimizes according to the number of subjects in the scene (i.e. people moving in/out of the scene). As can be seen in FIG. 8, at t2, the first resolution view area 820 is targeted towards the detected active subject 830 compared to phase t0-t1, based on the determined active subject information.

In an embodiment, at t3, the first resolution view area 820 is transmitted from the videophone input apparatus for displaying on the first resolution display of the peer. Such method enables moving around a video image scene by adjusting the output image using the redundant pixels that fall outside the maximal output range of the display device, such as a TV. Such may be achieved by using shape (basic anatomy) recognition algorithms to identify the target within the scene that is actively speaking. Once target is identified the output image slowly (virtually) pans and zooms to align to reposition the active target according to predefined composition layout rules. This method is a slow motion (nearly imperceptible) dynamic feature that continually adjusts the field of view to track a conversation without physically adjusting the input device (camera).

Figure 9:
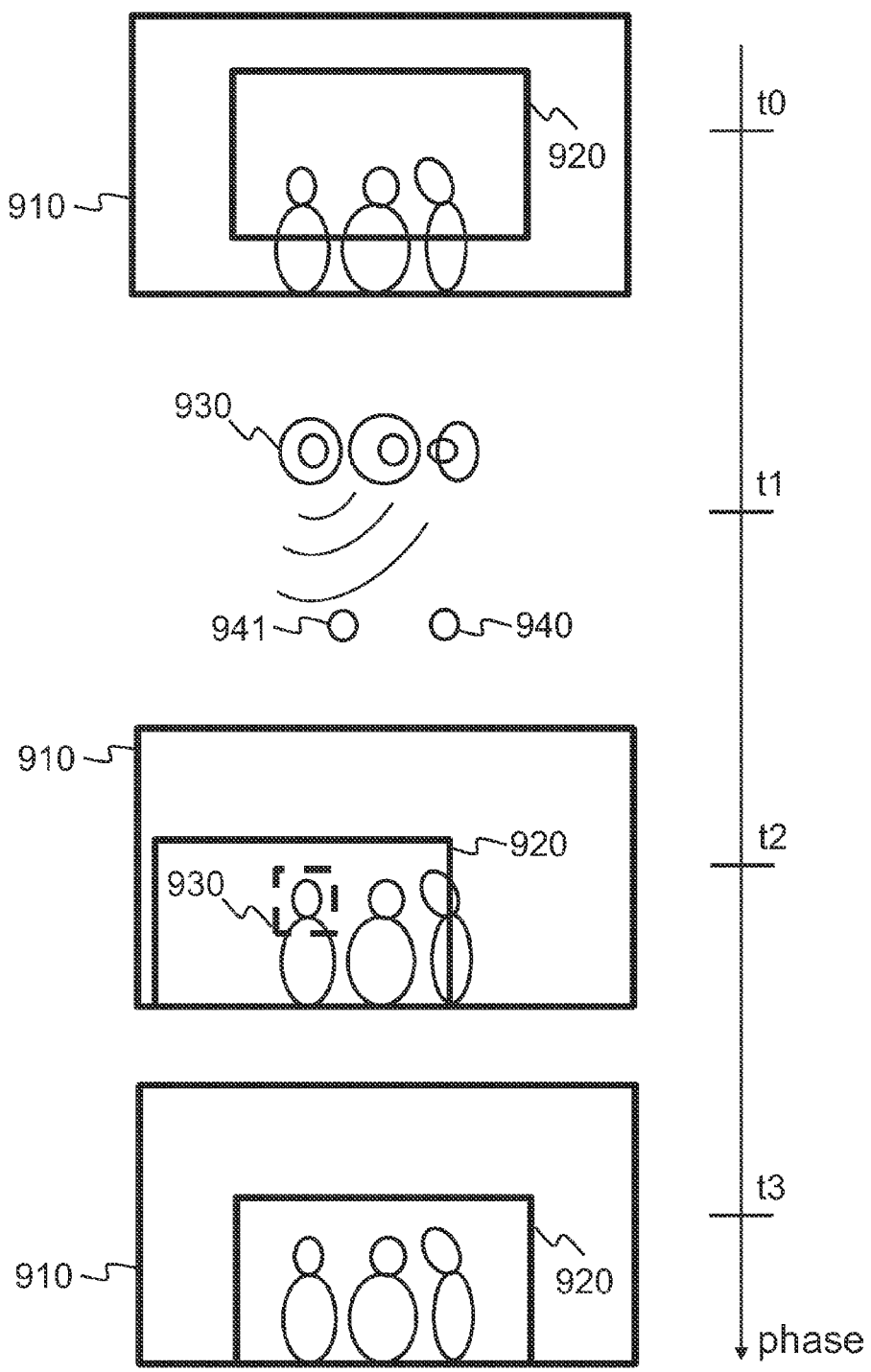
FIG. 9 shows a schematic picture of steps relating to an example embodiment.

FIG. 9 shows a schematic picture of steps relating to an example embodiment.

Phase t0 may represent a moment right after a video call connection between a videophone apparatus and a peer is established. At t0 an audio connection for the call may be opened. On a display of a peer apparatus a first resolution view area 920 presents a video stream of a videophone input apparatus participating the video call. Such stream is provided by a local camera of the videophone input apparatus. A total image capture area 910 represents a second resolution video stream provided by the camera of the video input apparatus. Resolution information of the first resolution display may be received by the videophone input apparatus from the peer in the beginning of the video call, for example. Alternatively, the display resolution information may be stored in the system, for example in the server apparatus and fetched from there when needed or stored to the video input apparatus.

In an embodiment, at t1, an algorithm is used for active subject detection. At least one microphone 940, 941 may be used to detect direction of a voice from the active subject 930. An example embodiment would require a minimum of two microphones for determining the direction of the voice source based on time delay estimates. Using three microphones may be optimal, however. Phase t1 is illustrated from above to schematically show the principle of voice direction detection. The microphone 940, 941 may be located in the videophone input apparatus.

In an embodiment, the voice direction detection may be used together with the shape recognition illustrated in FIGS. 7-8. The shape recognition is configured to recognize at least one subject shape. This may be achieved by using a combination of microphone arrays and shape (motion and basic anatomy) recognition algorithms to identify the active target 930 within the scene that is actively speaking.

In an embodiment, all possible voice sources are first determined by motion/shape recognition. Furthermore, the active voice source (person talking) would be determined by the audio direction detection. In this approach the results from the motion/shape recognition may improve the post-processing performance and accuracy of the audio direction detection.

The generated local video stream by the videophone input apparatus may be targeted towards the active subject by selecting the first resolution view area 920 from the second resolution video signal area 910 based on the determined active subject information.

In an embodiment, at t2, a video image scene is adjusted using the redundant pixels that fall outside the maximal output range of the peer display device, such as a TV. Once active target is identified, using at least one of the local video stream with shape recognition and the local audio stream with voice direction detection, the output image (virtually) pans to align the target to the composition layout rules, which vary according to number of targets and relative positioning of targets. The purpose of this method is to create compositionally balanced video call scenes by repositioning the subjects automatically, without physically adjusting the input device (camera). This method also applies to simply zooming functions ("make me bigger"/"make me smaller") This method can be part of a set procedure, or as a dynamic feature that continually optimizes according to the number of subjects in the scene (i.e. people moving in/out of the scene). As can be seen in FIG. 9, at t2, the first resolution view area 920 is targeted towards the detected active subject 930 compared to phase t0-t1, based on the determined active subject information.

In an embodiment, at t3, the first resolution view area 920 is transmitted from the videophone input apparatus for displaying on the first resolution display of the peer. Such method enables moving around a video image scene by adjusting the output image using the redundant pixels that fall outside the maximal output range of the display device, such as a TV. Such may be achieved by using shape (basic anatomy) recognition algorithms to identify the target within the scene that is actively speaking. Once target is identified the output image slowly (virtually) pans and zooms to align to reposition the active target according to predefined composition layout rules. This method is a (nearly imperceptible) dynamic feature that continually adjusts the field of view to track a conversation without physically adjusting the input device (camera).

In an embodiment, the first resolution view area 720, 820, 920 may be moved inside the second resolution total capture area 710, 810, 910 and targeted based on the detected active subject 730, 830, 930.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the disclosed embodiments are set out in the independent claims, other aspects comprise other combinations of features from the described embodiments and/or the dependent claims with the features of the independent claims, and not solely the combinations explicitly set out in the claims.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A videophone input apparatus, for tracking an active subject in a video call service, comprising:
   a communication interface for communicating with a peer;
   at least one processor; and
   at least one memory including computer program code;
   the at least one memory and the computer program code configured to, with the at least one processor, cause the videophone input apparatus to:
   establish a peer-to-peer connection between the videophone input apparatus and a peer over a wireless connection;
   receive information of a first resolution display of an A/V output apparatus of the peer;
   generate a local video stream in the videophone apparatus based on a video signal provided by a second resolution camera of the videophone apparatus, the second resolution being greater than the first resolution;
   generate a local audio stream in the videophone input apparatus based on an audio signal provided by a microphone of the videophone input apparatus;

determine active subject information of the video call using at least one of the local video stream and the local audio stream;

target the local video stream towards the active subject by selecting a first resolution view area from the second resolution video signal based on the determined active subject information; and transmit the first resolution view area for displaying on the first resolution display.

2. The videophone input apparatus of claim 1, the at least one memory and the computer program code configured to, with the at least one processor, cause the videophone apparatus further to:

recognize the active subject from the second resolution video signal using shape recognition; and determine active subject information based on the recognized active subject.

3. The videophone input apparatus of claim 1, the at least one memory and the computer program code configured to, with the at least one processor, cause the videophone apparatus further to:

recognize the active subject from the audio signal using sound direction detection; and determine active subject information based on the recognized active subject.

4. A method for tracking an active subject in a video call service comprising:

establishing a peer-to-peer connection between a videophone input apparatus and a peer over a wireless connection;

receiving information of a first resolution display of an A/V output apparatus of the peer;

generating a local video stream in the videophone apparatus based on a video signal provided by a second resolution camera of the videophone apparatus, the second resolution being greater than the first resolution;

generating a local audio stream in the videophone input apparatus based on an audio signal provided by a microphone of the videophone input apparatus;

determining active subject information of the video call using at least one of the local video stream and the local audio stream;

targeting the local video stream towards the active subject by selecting a first resolution view area from the second resolution video signal based on the determined active subject information; and transmitting the first resolution view area for displaying on the first resolution display.

5. The method of claim 4, further comprising:

recognizing the active subject from the second resolution video signal using shape recognition; and determining active subject information based on the recognized active subject.

6. The method of claim 4, further comprising:

recognizing the active subject from the audio signal using sound direction detection; and determining active subject information based on the recognized active subject.

7. The method of claim 4, further comprising:

generating the local audio stream in the videophone input apparatus based on audio signals provided by at least two microphones of the videophone input apparatus;

recognizing the active subject from the audio signals using sound direction detection; and determining active subject information based on the recognized active subject.

8. The method of claim 4 further comprising:

targeting the local video stream towards the active subject by selecting a first resolution view area from the second resolution video signal based on the determined active subject information.

9. The method of claim 8 further comprising:

targeting the local video stream towards the active subject using at least one of the following:

moving the first resolution view area in a horizontal direction;

moving the first resolution view area in a vertical direction; and zooming the first resolution view area.

10. A computer program embodied on a non-transitory computer readable medium comprising computer executable program code, which when executed by at least one processor of a videophone apparatus, causes the videophone apparatus to: establish a peer-to-peer connection between the videophone input apparatus and a peer over a wireless connection;

receive information of a first resolution display of an A/V output apparatus of the peer;

generate a local video stream in the videophone apparatus based on a video signal provided by a second resolution camera of the videophone apparatus, the second resolution being greater than the first resolution;

generate a local audio stream in the videophone input apparatus based on an audio signal provided by a microphone of the videophone input apparatus;

determine active subject information of the video call using at least one of the local video stream and the local audio stream;

target the local video stream towards the active subject by selecting a first resolution view area from the second resolution video signal based on the determined active subject information; and transmit the first resolution view area for displaying on the first resolution display.

\* \* \* \* \*